United States Patent [19]

Davinson

[11] 4,357,104

[45] Nov. 2, 1982

[54] MONITORING DISTANCE VARIATIONS

[75] Inventor: Ian Davinson, Darley Abbey, England

[73] Assignee: Rolls-Royce Limited, London, England

[21] Appl. No.: 217,146

[22] Filed: Dec. 16, 1980

[30] Foreign Application Priority Data

Dec. 21, 1979 [GB] United Kingdom ............... 7944134

[51] Int. Cl.³ ........................... G01C 3/08; G01J 1/20
[52] U.S. Cl. ....................................... 356/4; 250/201
[58] Field of Search ................. 356/4, 1, 28; 102/213; 369/45; 250/201

[56] References Cited

U.S. PATENT DOCUMENTS 4,059,841 11/1977 Bricot et al. ........................ 250/201
4,079,247 3/1978 Bricot et al. ........................ 250/201
4,314,760 2/1982 Hodge et al. ............................ 356/4

FOREIGN PATENT DOCUMENTS 1493963 12/1977 United Kingdom .

Primary Examiner—S. C. Buczinski

[57] ABSTRACT

An optical device for monitoring variations in the distance between an object and a datum is particularly useful for monitoring running clearances in the demanding environment of a gas turbine engine. The device depends upon the principle that an image focussed by an astigmatic lens system changes shape as it passes through the focus. To monitor variations, e.g., in the working clearance between a turbine blade tip and a turbine casing, light from a light source is projected through an astigmatic lens system, onto the blade tip. Reflected light from the astigmatic image on the blade tip is passed back through the lens system and re-projected onto an image shape monitor which includes photo-cells. The photo-cells may be mounted in the main optical assembly or probe, or they may be distant from the probe and fed by light guides. Signals from the cells are combined to produce a monitor signal, the magnitude of which is a measure of the shape of the image on the blade tip, and hence of the clearance.

21 Claims, 3 Drawing Figures

MONITORING DISTANCE VARIATIONS

FIELD OF THE INVENTION

This invention relates to the continuous monitoring of variations in distances between a datum and an object. The invention provides an optical device which is particularly applicable to the task of continuously monitoring variations in clearance between relatively rotating components, such as rotor blades and their casings in axial-flow compressors or turbines.

BACKGROUND OF THE INVENTION

In the development and operation of axial flow gas turbine engines, it is particularly desirable to be able accurately to monitor the clearances between the tips of rotor blades in the engines and their surrounding casings, because excessive blade tip clearances are detrimental to the efficiency of the engine and result in excessive fuel consumption, whilst blade tip clearances which are too small result in damage to the engine. The problem of reduction of engine efficiency with increasing blade tip clearance is particularly acute when turbine blades are not provided with shrouds at their radially outer ends.

The monitoring of blade tip clearances has become important as a research and development tool in the gas turbine industry, and also shows promise of becoming important in operational engines to give warning of dangerously small clearances during transient operating conditions. Clearance monitoring devices are also required for use as components in active control systems in order to provide a control signal to, e.g. an electro-mechanical system which maintains the clearance to an optimum value under all operating conditions.

There is a requirement for a blade tip clearance monitoring device which enables high-accuracy real-time clearance measurements to be obtained (preferably for each individual blade or portion thereof as its passes the monitoring station at operational speeds) under the severe operational and environmental conditions in and adjacent to gas turbine flow passages. These severe conditions include very fast blade tip speeds, vibration, and the high pressures, velocites and temperatures of the turbine gases. Whilst being able to cope with these demands, the device should preferably be simple, reliable for long-term operation in an engine in normal airline or military service, cheap, and easy to install, calibrate and maintain. When used in active control systems, it should give an output signal which gives a clear indication of the optimum clearance.

OBJECTS OF THE INVENTION

It is a primary object of this invention to teach the construction of an optical device which may be readily installed in gas turbine engines or other machinery and which can be used to give a continuous indication of the running clearance between moving parts, particularly of the clearance between turbine blades and the turbine casing in a gas turbine aeroengine.

A related object of this invention is to provide a device capable of giving an output signal which is readily usable as a control signal in an active control system for maintaining a running clearance at an optimum value.

A further related object of this invention is to provide a device which can achieve the above objects whilst being simple in construction and having no moving parts.

Further objects of the invention will be apparent from the following description and claims.

SUMMARY OF THE INVENTION

According to the invention, an optical device for monitoring variations in the distance between an object and a datum comprises, in general terms:

a light source;

an astigmatic optical system for projecting an astigmatic image of said light source onto said object, said astigmatic optical system including said datum; and image shape detector means for detecting changes of shape of said astigmatic image on said object due to said variations in the distance between said object and said datum, and for producing a monitor signal whose value is dependent on the shape of said astigmatic image on said object:

said astigmatic optical system being arranged such that light reflected from said astigmatic image on said object passes back through said astigmatic optical system and is thereby projected onto a light-receiving surface of said image shape detector means as an astigmatic image of said astigmatic image on said object, said light-receiving surface of said image shape detector means being located in the proximity of said light source.

Preferably, the image shape detector means comprises photo-cell means, or an equivalent, and in one embodiment of the invention comprises a photo-cell of the dual axis position sensor type whose X and Y axis outputs are combined to produce the monitor signal. In an alternative embodiment the image shape detector means comprises a plurality of (e.g. four) photo-cells whose outputs are combined to produce the monitor signal. In either case the photo-cell(s) may be part of a main optical assembly of the device, so that the light-receiving surface(s) of the photo-cell(s) in fact comprise(s) the light-receiving surface of the image shape detector means; alternatively the photo-cell(s) may be situated remotely from the main optical assembly of the device, the light-receiving surface(s) of the photo-cell(s) being connected to the light-receiving surface of the image shape detector means by light guide means.

Conveniently, the light-receiving surface of the image shape detector means is disposed symmetrically around the light source. When the image shape detector means comprises a plurality of photo-cells forming part of the main optical assembly or situated remotely therefrom, or when it comprises a single photo-cell of the dual axis position sensor type situated remotely from the optical assembly, the light-receiving surface of the image shape detector means is advantageously divided into a plurality of light-receiving locations which are equi-angularly spaced around the light source; in the case where the photo-cells form part of the main optical assembly, the light-receiving locations correspond to the light-receiving surfaces of the photo-cells, whereas if the photo-cells are situated remotely, the light-receiving locations correspond to the light-receiving ends of light guides which transmit the light to the photo-cells as desired. Thus, taking embodiments of the invention in which there are four light-receiving locations equi-angularly spaced around the light source and connected by respective light guides to remotely situated photo-cells: each location can be connected to one of four remotely situated photo-cells; or, each pair of diametrically opposed locations can be connected to one of two remotely situated photo-cells; or, all four locations can be connected to one photo-cell of the dual axis position sensor type, whereby each light guide transmits light to a position on the photo-cell corresponding to the angular positon of the location with respect to the light source. The light-receiving ends of the four light-guides are advantageously each configured as a quadrant of a circle centred on the light source. Alternatively, the light-receiving ends of the light-guides could be circular.

The light source is preferably a light-emitting end of an optical fibre into the other end of which light is injected from, e.g. a light-emitting diode, such as a laser diode. Conveniently, the optical fibre comprising the light source and the light-guide means referred to above are bonded together to form a unitary structure which is a composite optical component for emitting and receiving light.

A suitable astigmatic optical system for the device comprises, in series, a collimator lens for collimating the light from the light source, an astigmatic lens for producing the required degree of astigmatism, and a projecting lens for projecting the astigmatic image of the light source onto the object whose distance from the datum is to be monitored. The collimating and projecting lenses may be compound to improve the layout and optical performance of the probe.

BRIEF DESCRIPTION OF THE DRAWINGS.

The invention will now be described, by way of example only, with reference to the accompanying drawings in which:-

The drawings are not to scale.

DESCRIPTION OF THE PREFERRED EMBODIMENTS.

Figure 1:
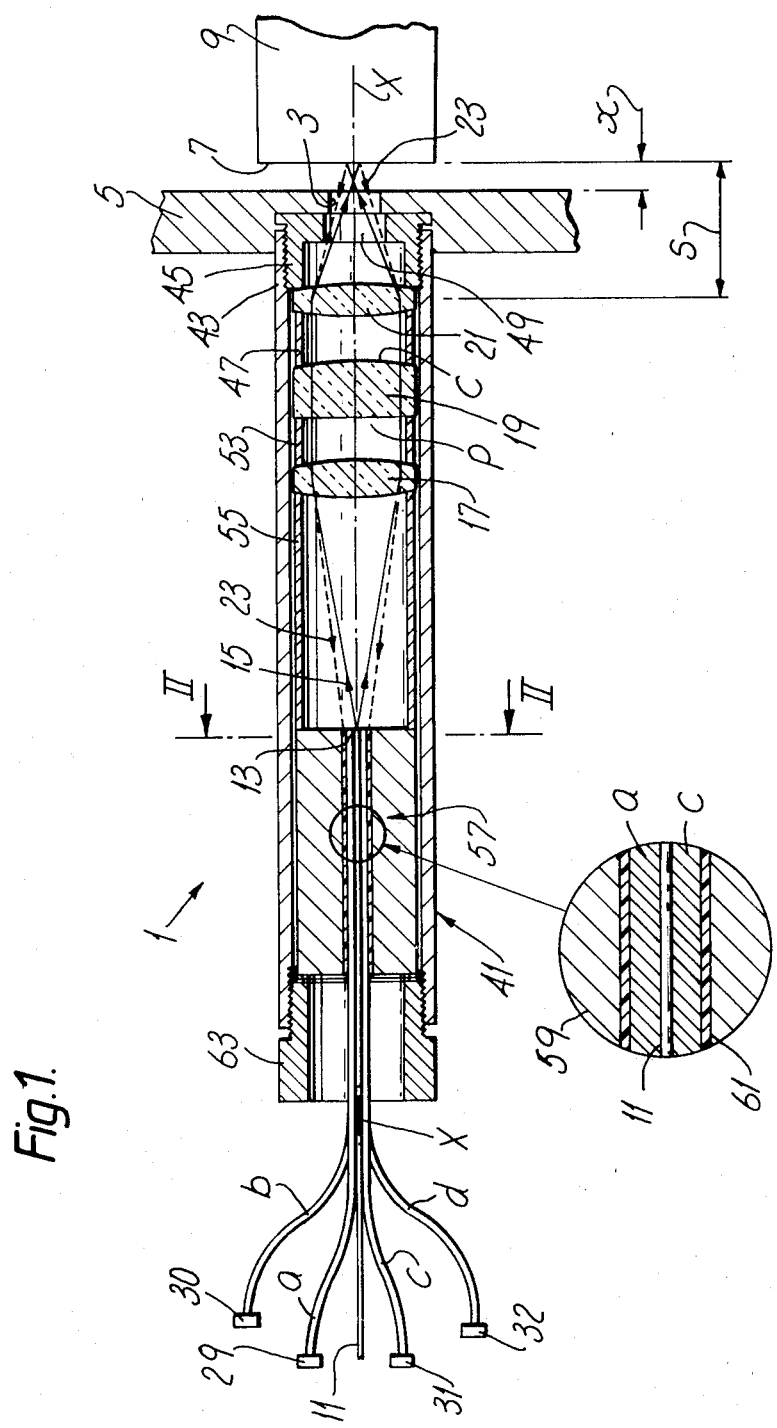
FIG. 1 shows the layout of the apparatus and its components in diagrammatic form.

FIG. 1 shows how the optical components necessary for performing the invention may be conveniently arranged to form an optical probe 1, which is accurately locatable against an aperture 3 in the turbine casing 5 of a gas turbine engine in order to monitor the clearance x between the tip 7 of the turbine blade 9 and the turbine casing 5, which for simplicity is shown as just a single wall thickness.

The probe is the main optical assembly of the apparatus, and is designed on the principle that a light beam which is focussed by an astigmatic lens system changes shape as it passes through the focus. A solid object, such as the tip 7 of turbine blade 9, placed near the focus, has a spot of light projected onto it, the shape of the spot depending on the exact distance S of the object from the objective end of the lens system, which is taken to define a datum from which S is measured. If a detector is then incorporated which produces an output dependent on spot shape, this output will then provide a measure of the distance S, and hence of clearance x.

In probe 1, the end 13 of a single optical fibre 11 acts as the light source. Fibre optic 11 has light from a suitable projector lamp, light emitting diode, or laser diode (not shown) fed into its other end distant from the probe 1. Light emitted from the end 13 of fibre optic 11 diverges in approximately a 30° cone as indicated by solid direction lines 15 and is then collimated by a lens 17. The light next passes through a weak cylindrical lens 19, which introduces the astigmatism, and is then focussed down onto the turbine blade tips by lens 21. An astigmatic image of the end 13 of the fibre optic 11 is thus projected onto the blade tips.

The lenses 17 and 21 are of course convex spherical elements, and their centres of curvature are in alignment with common optical axis X—X, which also includes the centre of the end 13 of fibre optic 11. Because lenses 17 and 21 are used on axis, they only impart spherical aberation and diffraction to the image of the light source, and thus if used without the cylindrical lens 19, would project a circular spot of light onto the blade tip 7.

Note that it would be possible to utilise an assymetric lens, or a lens/prism combination, in order to make the probe "look" at an angle on to the blade tip. This could be necessary in situations where it is not convenient to position the probe so that the optical axis X—X is approximately normal to the tip of the blade.

The weak cylindrical lens 19 has a plane face P and a cylindrically convex face C whose longitudinal axis is perpendicular to the plane of the paper. The focal length of the lens system 17, 19, 21 in the plane of the paper is therefore different from its focal length in a plane perpendicular to the plane of the paper. In fact, the focal length in the plane perpendicular to the plane of the paper is shorter, the focal length in the plane of the paper being almost unaffected by lens 19 because in this plane it is effectively a plane sheet of glass.

As an object, such as the blade tip 7, is moved in towards the probe 1 from the first focal position, corresponding to the long focal length, to the second focal position, corresponding to the shorter focal length, the image which the lens system projects on to it will change in shape respectively from a line in the plane of the paper to a line in a plane perpendicular to the plane of the paper. At a position between the two focal positions, the image of the source 13 will be equally out of focus in both planes and here the image will be circular. It is arranged that this latter position corresponds to the optimum clearance x. A suitable size for this circular spot of light is 0.25–0.5 mm. For comparison, the thickness of a shroudless blade tip may be 1 mm-1 cm depending on whether it is provided with "squealers".

The image on the blade tip can itself be regarded as a source of light, and the lens system 17, 19, 21 allows projection of image light 23 (dashed direction lines) back through the system on to the light source 13 and the area surrounding it. Since additional astigmatism is introduced into the image as it is re-projected back through the lens system, the line-circle-line transformation still occurs around source 13, but with the effect increased by an amount depending on the ratio of the focal lengths of lenses 17 and 21.

In order to detect the change of shape, the light incident at four locations 25, 26, 27 and 28 (FIG. 2) disposed around source 13 is monitored by an image shape detector comprising photo-cells. The four locations are in fact the light-receiving ends of four separate optical fibres a, b, c, d, the light receiving end of each fibre preferably being shaped to form a quadrant of a circle centred on source 13. However, at a small penalty in loss of light-receiving area, the light-receiving ends may be circular, arranged in conjunction with the light source 13 as shown in FIG. 3. The four fibres a, b, c, d, act as light guides for transmitting the image light which falls on them to corresponding photo-cells 29–32 (shown diagrammatically in FIG. 1). As an alternative to the use of single optical fibres as light-guides, four separate bundles of optical fibres may be used, the light-receiving end of each bundle being quadrant-shaped (FIG. 2) or circular (FIG. 3).

Note that as an alternative to the use of optical fibres or equivalent rigid light-guides to transmit the image light 23 to the photo-cells, four circular or quadrant-shaped photo-cells could be positioned at the locations 25 to 28 around the light source 13 to receive the image light 23 directly. Further, instead of disposing the light-receiving locations around the light-source 13, a beam-splitter could be used to intercept the image light and direct it to another convenient position in the probe. However, the illustrated embodiment is preferred for gas turbine environments because it gives less light-loss than a beam-splitter arrangement and because photo-cells are sensitive to heat and vibration whilst properly constituted optical fibres or rigid light guides are relatively robust.

Figure 2:
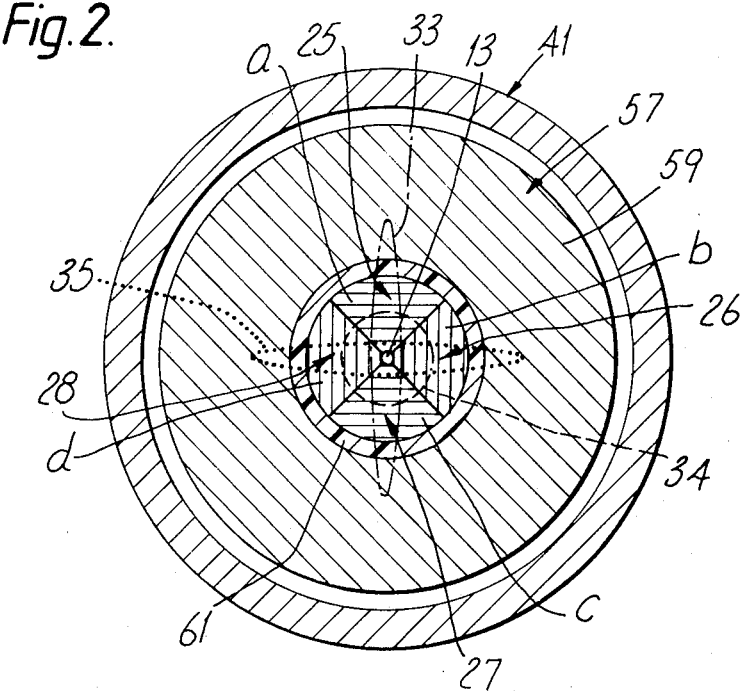
FIG. 2 is an enlarged view on the section II—II in FIG. 1.
Figure 3:
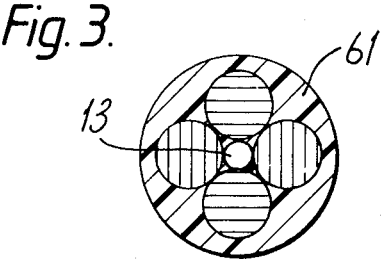
FIG. 3 is an alternative arrangement of the central part of FIG. 2.

The three basic modes in which image light 23 falls on the guadrants a to d (and hence on the photo-cells 29–32 to which they are connected) are illustrated in FIG. 2 by reference numbers 33, 34 and 35. The probe 1 is oriented with respect to the casing aperture 3 (FIG. 1) such that when the distance S, and hence clearance x, is large, the elongated spot of light 33 (chain-dotted shape) is produced when the blade tip 7 is exactly in line with optical axis X—X. Spot 33 falls mainly on quadrants a and c, producing relatively large photocurrents in cells 29 and 31, but only small photocurrents in cells 32 and 30. When clearance x is at its nominally optimum value, a circular spot of light 34 (dashed circle) is produced and falls equally on all the quadrants, producing momentarily equal photocurrents in all four cells. When the clearance is small, the elongated spot of light 35 (dotted shape) thereby produced falls mainly on quadrants b and d, producing relatively large photocurrents in cells 30 and 32, but only small photocurrents in cells 29 and 31.

If the quadrant reference letters a to c are taken to represent the amount of light which each of them receives, they can also be taken to represent the output voltages of corresponding cells 29 to 32, since these are proportional to the amount of the light incident upon them. It is required to produce a clearance monitor signal whose magnitude is a measure of the shape of the light spot. Such a monitor signal can be obtained if the photo-cell output voltages are combined in the ratio $(a \times c)/(b \times d)$. This is easily done by appropriate well-known bridge circuitry. Another such ratio expressive of the shape of the light spot is $(a+c)/(b+d)$. This latter ratio can be achieved using only two photo-cells if fibre-bundles are used and the fibres of each pair of diametrically opposing quadrants a,c and b,d are mixed together to form two bundles instead of four, each of the two bundles being led to a corresponding detector, whose outputs are then ratioed.

In practice, the outputs of the detectors 29 to 32 are individually amplified before use in order to emphasize the differences in the amount of light received by the detectors. The amplification makes it easier to detect small changes in the shape of the light spot.

Utilising either of the above mentioned ratios, we see that if clearance x is at the optimum value, resulting in circular light spot 34 falling equally on all quadrants a to c as shown in FIG. 2, then the monitor signal voltage will be unity during the period for which the whole of the light spot falls on the blade tip 7 as it passes optical axis X—X, because $a+c=b+d$, or $a \times c = b \times d$ during that period (this assumes a blade tip of constant height). If the clearance x during that period is less than the optimum, giving light spot 35, then $a+c<b+d$, or $a \times c < b \times d$, and the monitor signal voltage will be less than unity. If the clearance x is greater than the optimum, resulting in light spot 33, than $a+x>b+d$, or $a \times c > b \times d$, and the monitor signal voltage will be greater than unity.

The reaction times of the photo detector cells are fast enough to permit the clearance of each blade to be determined as it passes under the probe at operational speeds, e.g. by displaying the monitor signal on an oscilloscope against a time scale derived from a once/rev. synchronising signal from a tachometer on the turbine rotor shaft. The monitor signal produced by any particular blade can easily be identified by digital electronic counting of the number of blades passing under the probe, starting from the once/rev. synchronising signal, which of course is tied to a particular angular position on the rotor representing a chosen blade. The signal operating the electronic counter can be an addition signal from the photo-detectors, which can be expressed (in terms of the light received by the quadrants) as $a+b+c+d$. In order to operate the counter, a trigger circuit combined with a differentiating circuit can be connected to receive the addition signal and to give an output pulse when the signal reaches its maximum voltage level, indicating that a blade is substantially coincident with the optical axis X—X of the probe.

The monitor signal may be used to control an automatic servo-system of known type for adjusting the clearance x by, e.g., increasing or decreasing the effective diameter of a segmented turbine casing. In this case the controlling parameter may be the clearance of the longest blade, so that a feedback signal for the servo-system would be derived from that part of the monitor signal associated with the presence of the longest blade under the probe. Electronically, this could be done, for example, by feeding the monitor signal to "peak-picking" circuitry of known type whenever a blade is coincident with optical axis X—X. The peak picker would then output only the clearance information associated with the longest blade because whether the monitor signal voltage is greater or less than unity when the blade is under the probe, the longest blade will produce the monitor signal of greatest value. If the feedback signal voltage thus extracted from the monitor signal is less than or greater than unity, the servo-system then acts to restore the feedback signal value to unity.

It has thus far been assumed that although the distance S is liable to vary from blade to blade, it will remain constant during the passage of any one blade past the probe, because the blade is a constant height across its thickness. However, the photo-detectors are sensitive enough and react fast enough to changes in the shape and intensity of the light spot to enable the monitor signal to change with the variations in S seen by the probe as a blade or non-constant height passes by. The probe can thus be used to monitor the clearances of blades with "squealer" tips, or of blades with integral shrouds.

An example of a photo-detector cell suitable for use in the present invention is the one marketed by RCA Corp. under the designation C30844. This is a quadrant cell, i.e. equivalent to four cells in one unit, and is therefore particularly convenient for use in our invention.

As an alternative to the use of the photo cells described above, a single photo cell of the dual axis position sensor type could be used. An example of such a type is the PIN-SC/4D, manufactured by United Detector Technology Inc., of Santa Monica, Calif. Such cells are normally utilised to provide intensity and X- and Y-axis position information of a circular light spot on the detector surface, but when utilised in the present invention, where the position of the centre of the light spot is fixed, their X and Y outputs vary according to the intensity and shape of the spot and can thus be combined to produce the monitor signal. At present their speed of response to varying light stimuli is such that they would not be suitable for use in conjunction with blades having "squealer" tips. As with the other type of photo cells already mentioned, the position sensor type of cell may be located either in the probe to receive image light directly, or distant from the probe, receiving image light via light guides.

The construction of the probe will now be described in more detail with reference to FIG. 1.

The basic metallic component is the cylindrical probe body 41, which contains the lens system and the light-emitting and receiving fibre-optics. The lens 21, which can be considered to be an objective lens for the light spot which it also focusses on to blade tip 7, is held in the objective end 43 of the probe body 41 between plug member 45, which is threaded to screw into the objective end 43, and cylindrical spacer 47. Plug member 45 has a circular aperture 49 centred on optical axis X—X, through which aperture the light 15 from source 13 is projected and the image light 23 is reflected. The distance between the front surface of lens 21 and the inner surface of the casing wall 5 is critical, the focal length of the lens system being chosen such that it is great enough to give acceptable protection to lens 21 from the gases in the turbine passage, and hence prevent contamination by those gases, whilst also giving good light gathering power in combination with aperture 49. If necessary, clean compressed air (e.g. filtered compressor air bled from the compressor of the gas turbine engine) can be fed into the chamber in front of lens 21, the compressed air then exiting through aperture 49, thus preventing ingress of the turbine gases. Aperture 49 also acts as a glare stop to cut down the amount of turbine and combustor flame radiation getting into the optical system.

The cylindrical astigmatic lens 19 is held in position by cylindrical spacers 47 and 53, spacer 47 having a specially shaped end which mates with the part-cylindrical shape of the face C. Collimating/focussing lens 17 is in turn held between spacers 53 and 55. Alternatively, lens 19 may have an annular flat ground on to its edge, thus allowing spacer 47 to be plain-ended and allowing rotation of the lens relative to the fibre optics as an aid to proper adjustment of the optical system during assembly or installation of the probe.

The single light-emitting optical fibre 11 and the four light receiving optical fibres a to c are incorporated in a composite optical component 57, viewed in end elevation in FIG. 2. This component consists of a metal ferrule 59 containing a plastic (e.g. epoxy or polysulphone) resin insert 61 acting as a matrix in which are embedded the fibre optics. The four optical fibres a to c may be composed, for example, of flexible glass or plastic fibres, whilst the central emitter fibre 11 may be a 300$\mu$ diameter coated quartz fibre.

Finally, plug member 63 is threaded to screw into the end of probe body 41 in order to bear against metal ferrule 59 and hold all the components in place within the bore of probe body 41.

In order to allow for thermal expansion of the components of the probe assembly, resilient washers 65 are included between the metal ferrule 59 annd plug member 63. Alternatively one (or more) of the spacers 47, 53, 55 may be slotted to render it resilient in the compressive sense.

In order to render lens 21 scratch resistant and to give it good high-temperature performance, it may be made of sapphire. In order to reduce spherical aberation whilst retaining a wide aperture to give the optical system good light-gathering power, lens 21 may be replaced by a compound lens, the element nearest the turbine passage being of sapphire. To render that end of the probe nearest the turbine passage completely dust- and gas-tight, the sapphire lens may be brazed into its seating. Further, instead of plug member 45 being located by means of a screw thread, it may be welded into position.

For ease of maintenance and installation, the lens system may be manufactured as a dust- and gas-tight module adapted to mate with a further module comprising the fibre-optic assembly. This is facilitated by the provision of the above-mentioned sapphire front lens and a sapphire window brazed into the other end of the lens system module, distant from the turbine passage. When the two modules are mated, the fibre optics fit against the sapphire window. In a further variation, improved performance of the probe may result from making collimating lens 17 compound too, so as to include a sapphire lens in place of the plane sapphire window.

I claim:

1. An optical device for monitoring variations in the distance between an object and a datum, comprising:
    a light source;
    an astigmatic optical system for projecting an astigmatic image of said light source onto said object, said astigmatic optical system including said datum; and
    image shape detector means for detecting changes of shape of said astigmatic image on said object due to said variations in the distance between said object and said datum, and for producing a monitor signal whose value is dependent on the shape of said astigmatic image on said object:
    said astigmatic optical system being arranged such that light reflected from said astigmatic image on said object passes back through said astigmatic optical system and is thereby projected onto a light-receiving surface of said image shape detector means as an astigmatic image of said astigmatic image on said object, said light-receiving surface of said image shape detector means being located in the proximity of said light source.

2. An optical device as claimed in claim 1 in which the light-receiving surface of the image shape detector means is disposed symmetrically around the light source.

3. An optical device as claimed in claim 1 in which the light-receiving surface of the image shape detector means comprises a plurality of light-receiving locations disposed symmetrically around the light source.

4. An optical device as claimed in claim 1 or claim 2 in which the image shape detector means comprises a photo-cell of the dual axis position sensor type having X and Y axis outputs, which outputs are combined to produce the monitor signal, the light-receiving surface of said photo-cell comprising the light-receiving surface of said image shape detector means.

5. An optical device as claimed in claim 1 or claim 2 in which the image shape detector means comprises a photo-cell of the dual axis position sensor type whose X and Y axis outputs are combined to produce the monitor signal, the light-receiving surface of said photo-cell being remote from the light receiving surface of said image shape detector means and connected thereto by light guide means.

6. An optical device as claimed in claim 1 in which the image shape detector means comprises a plurality of photo-cells whose outputs are combined to produce the monitor signal, the light-receiving surfaces of said photo-cells comprising the light-receiving surface of said image shape detector means.

7. An optical device as claimed in claim 3 in which the image shape detector means comprises a plurality of photo-cells whose outputs are combined to produce the monitor signal, the light-receiving surfaces of said photo-cells comprising the plurality of light-receiving locations.

8. An optical device as claimed in claim 1 in which the image shape detector means comprises a plurality of photo-cells whose outputs are combined to produce the monitor signal, the light-receiving surfaces of said photo-cells being remote from the light-receiving surface of said image shape detector means and connected thereto by light guide means.

9. An optical device as claimed in claim 3 in which the image shape detector means comprises a plurality of photo-cells whose outputs are combined to produce the monitor signal, the light-receiving surfaces of said photo-cells being remote from the light-receiving surface of said image shape detector means, each said photo-cell being connected by light guide means to a corresponding one of the plurality of light-receiving locations.

10. An optical device as claimed in claim 1 in which the image shape detector means comprises four photo-cells whose outputs are combined to produce the monitor signal, the light-receiving surfaces of said photo-cells comprising the light-receiving surface of said image shape detector means and said photo-cells being equi-angularly spaced around the light source.

11. An optical device as claimed in claim 1 in which the image shape detector means comprises four photo-cells whose outputs are combined to produce the monitor signal and the light-receiving surfaces of said photo-cells are remote from the light-receiving surfaces of said image shape detector means, said light-receiving surface of said image shape detector means comprising four locations equi-angularly spaced around the light source and each one of said photo-cells being connected to a corresponding one of said locations by light guide means.

12. An optical device as claimed in claim 1 in which the image shape detector means comprises two photo-cells whose outputs are combined to produce the monitor signal and the light-receiving surfaces of said photo-cells are remote from the light-receiving surface of said image shape detector means, said light-receiving surface of said image shape detector means comprising four locations equi-angularly spaced around the light source and each one of said photo-cells being connected to two of said locations which are diametrically opposed to each other.

13. An optical device as claimed in claim 1 in which the light source comprises a light-emitting end of an optical fibre, means being provided for injecting light into the other end of said optical fibre.

14. An optical device as claimed in claim 13 in which means for injecting light in the optical fibre comprises a light-emitting diode.

15. An optical device as claimed in claim 1 in which the image shape detector means comprises: photo-cell means situated remotely from the light-receiving surface of said image shape detector means; and light guide means for transmitting light to said photo-cell means, said light guide means having a light-receiving end which comprises said light-receiving surface of said image shape detector means.

16. An optical device as claimed in claim 15 provided with a composite optical component for emitting and receiving light, said composite optical component comprising the light guide means and an optical fibre having a light-emitting end which forms the light source, said light guide means and said optical fibre being bonded together to form a unitary structure.

17. An optical device as claimed in claim 15 in which the photo-cell means comprises four photo-cells and the light guide means comprises four light guides, whereby the light-receiving surface of the image shape detector means comprises the light-receiving ends of said four light guides, said light-receiving ends of said four light guides being equi-angularly spaced around the light source.

18. An optical device as claimed in claim 15 in which the photo-cell means comprises two photo-cells and the light guide means comprises four light guides, whereby the light-receiving surface of the image shape detector means comprises the light-receiving ends of said four light guides, said light-receiving ends of said four light guides being equi-angularly spaced around the light source and each of said photo-cells being connected to two of said light guides which are diametrically opposed to each other at said light-receiving ends thereof.

19. An optical device as claimed in claim 17 or claim 18 in which the light-receiving ends of the light guides are each configured as a quadrant of a circle, said circle being centred on the light source.

20. An optical device as claimed in claim 17 or claim 18 in which the light-receiving ends of the light guides are circular.

21. An optical device as claimed in claim 1 in which the astigmatic optical system comprises in series collimator lens means for collimating the light from the light source, an astigmatic lens for producing the required degree of astigmatism, and projecting lens means for projecting the astigmatic image of the light source onto the object.

* * * * *